Feb. 6, 1940.  G. G. GRIFFIN  2,189,206
APPARATUS FOR ELECTRICALLY ROASTING COFFEE BERRIES
Filed Jan. 8, 1938  3 Sheets-Sheet 1
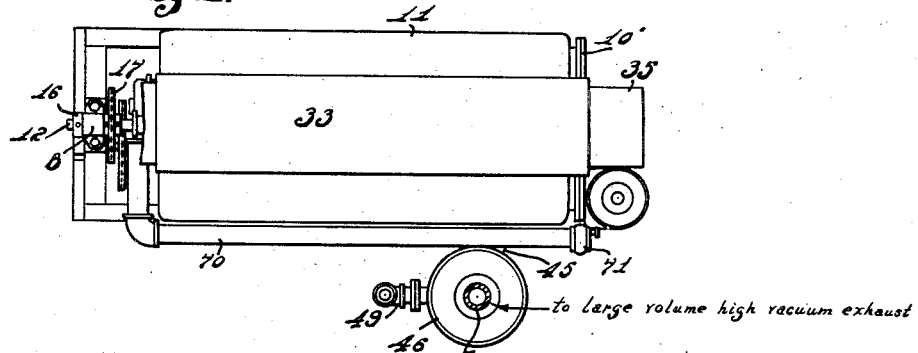
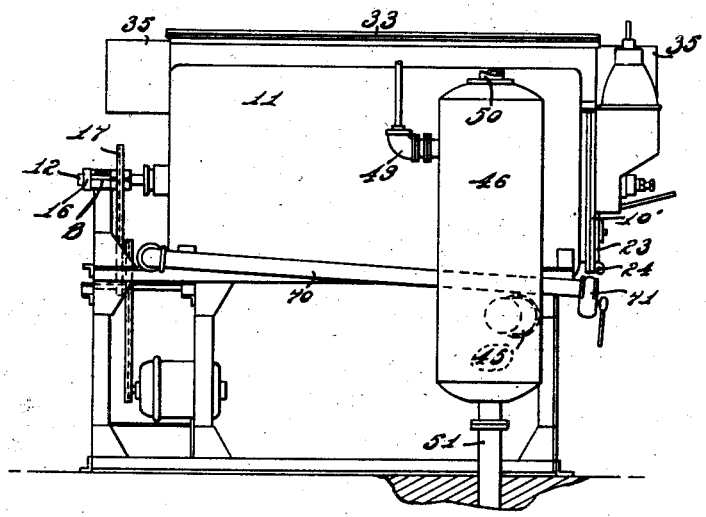
INVENTOR.
BY George G. Griffin,
Hood + Hahn.
ATTORNEYS.

INVENTOR.
BY George G. Griffin,
Hood + Hahn.
ATTORNEYS.

Feb. 6, 1940.  G. G. GRIFFIN  2,189,206
APPARATUS FOR ELECTRICALLY ROASTING COFFEE BERRIES
Filed Jan. 8, 1938  3 Sheets-Sheet 3
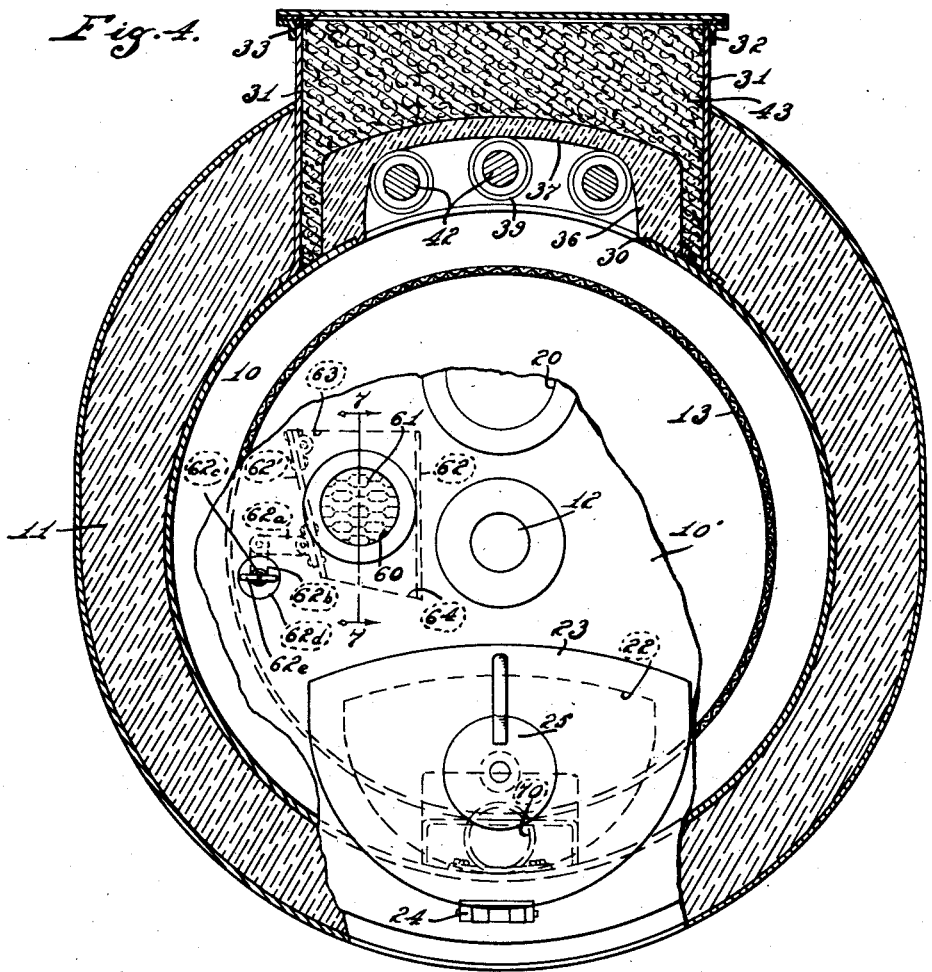
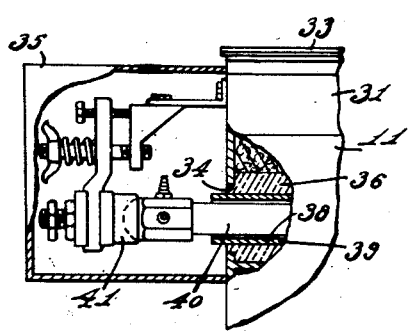
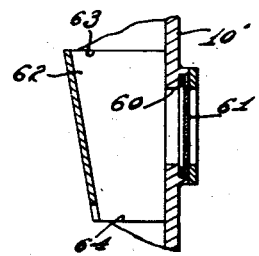
INVENTOR.
BY George G. Griffin,
Hood + Hahn
ATTORNEYS.

Patented Feb. 6, 1940

2,189,206

UNITED STATES PATENT OFFICE 2,189,206

APPARATUS FOR ELECTRICALLY ROASTING COFFEE BERRIES

George G. Griffin, Indianapolis, Ind.

Application January 8, 1938, Serial No. 183,956

6 Claims. (Cl. 34—5)

This application is a continuation in part of my application Ser. No. 714,769 filed March 9, 1934.

The object of my invention is to provide an improved commercially operable and efficient apparatus for roasting coffee berries whereby the fully roasted berry will possess the following characteristics:

(a) Have greater weight, per unit of roasted berry, than heretofore.

(b) Have a slower rate of deterioration as to loss of flavor and aroma than berries roasted by previously known methods and means.

(c) The ground berries will have a slower rate of deterioration as to loss of flavor and aroma than ground berries roasted by previously known methods and means.

(d) The roasted berries and their ground particles are noticeably freer from the presence of those fats which oxidize upon exposure to the air, as compared with contemporaneously roasted and ground berries roasted by previously known methods and means.

(e) The beverage brewed from the ground berries will possess the following characteristics, as compared with the beverage brewed from similar berries contemporaneously roasted by previously known methods and means:

1. Finer flavor and aroma because the roasted berry has retained a greater proportion of its pure fats which do not so readily oxidize and has parted with a greater proportion of its impure and more readily oxidizable fats.

2. Capability of reheating, after cooling, without as great loss of original flavor and aroma.

3. Capability of longer retention, under applied heat, of original flavor and aroma.

An essential characteristic of my improved apparatus is that it is of such construction as to facilitate the practice of my improved method under conditions which are commercially practicable and profitable. Manifestly if the practice of the method, in volume, would require the utilization of short lived expensive mechanism resulting in a production cost requiring retail prices largely in excess of current retail prices of coffee roasted by known methods and means, neither my improved method nor the improved apparatus would be in any way beneficial to the art.

The fundamental characteristics of my improved apparatus are that the berries receive the necessary heat within a relatively short period from an incandescent heat source through an ambient gaseous medium emanating from the roasting berries at a substantial subatmospheric pressure, under such conditions that a substantial proportion of the heat transfer occurs by direct radiation rather than by reason of physical contact, and that the incandescent heat sources are guarded against contamination by the unavoidable dust and chaff separated from the berries during the heating process whereby long life of the incandescent heat sources is assured.

The accompanying drawings illustrate an embodiment of my improved apparatus:

Fig 1 is a plan;

Fig. 2 is a side elevation;

Figure 3:
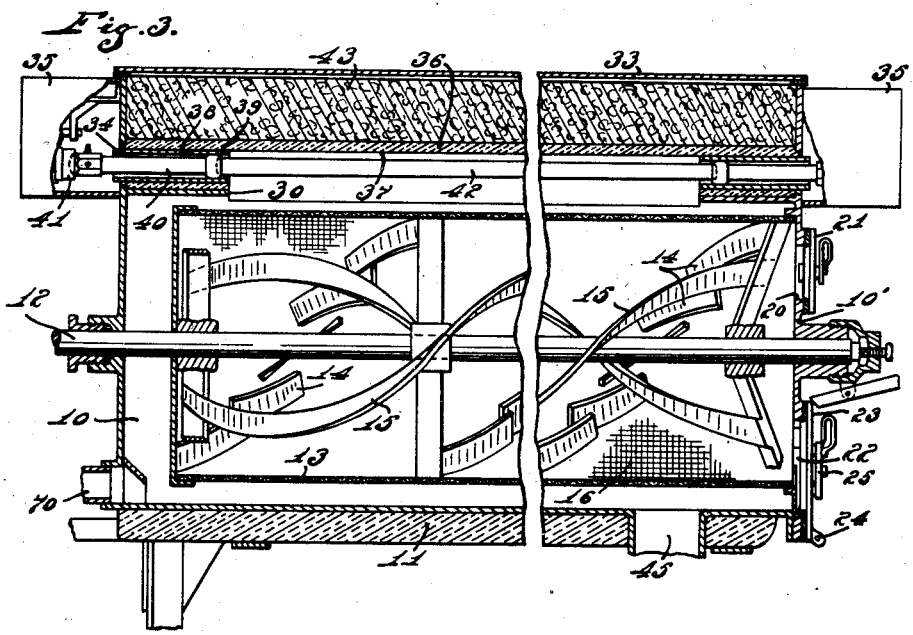
Figure 5:
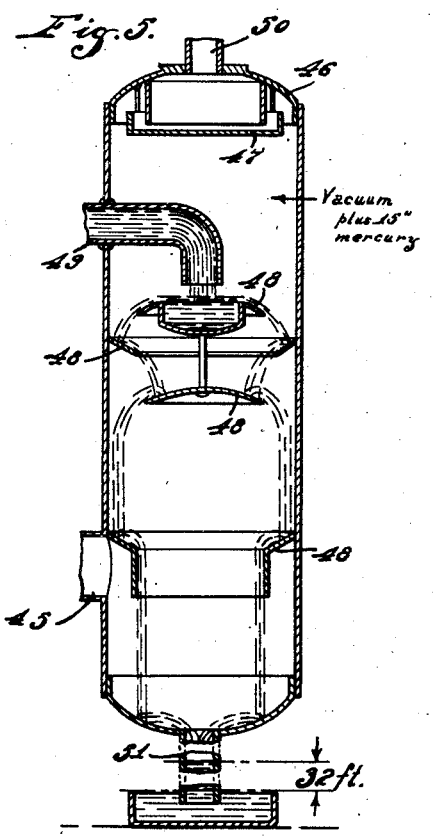

Fig. 3 a fragmentary axial vertical section on a larger scale;

Fig. 4 a fragmentary transverse section on a still larger scale;

Fig. 5 a vertical section through the condenser;

Fig. 6 a sectional detail of the mounting of one end of the electrical heating elements; and Fig. 7 a fragmentary section on lines 7—7 of Fig. 4.

In the drawings 10 indicates a roasting chamber, conveniently in the form of a nearly cylindrical structure and preferably heavily heat insulated, as indicated at 11, at least circumferentially.

Projected into chamber 10, axially thereof, is a shaft 12 which, within the chamber, carries a perforated cylindrical drum 13 within which there are segmental forwarding flights 14 and stirring flights 15. The shell of drum 13 is perforated, as indicated at 16, to as high a degree as possible consistent with stability and retention of the berries within the shell and one end is open and closely abuts the inner face of head 10' at the discharge end of chamber 10.

The open discharge end of drum 13 is kept in contact with the inner face of head 10' by any suitable means, such, for instance, as the collar 16 and sprocket 17 which are adjustable on the shaft on opposite sides of bearing B. Shaft 12 is rotated at a desired speed by a suitable driving train.

Head 10', in its upper region, is perforated at 20 and this perforation is normally sealed air-tight by a readily removable cover 21 which may be removed to permit the insertion of a feed spout, not shown, by means of which the drum 13 may be charged with a suitable charge of green berries. In its lower region, head 10' is provided with a discharge opening 22 normally closed by an air-tight closure 23 conveniently hinged at 24 and provided with locking means 25 which will permit ready withdrawal and replacement of closure 22.

The upper side of chamber 10 is slotted at 30 and flanking the edges of this slot are the side walls 31 of a box 32 provided with a removable cover 33 the main body of the box being sealed air tight to chamber 10, and the side walls 31 being spaced laterally from the edges of slot 30. The end heads of chamber 10 are perforated by a group of perforations 34, 34 in the ends of box 32 and these perforations are covered by air tight boxes 35, 35. Bridging slot 30 and extending between the end walls of box 32 is a block 36 of heat-insulating material having a medial downwardly presented cavity 37 for the major portion of its length, the two ends of block 36 being longitudinally perforated at 38, 38, alined with perforations 34. Removably mounted in each perforation 38, and axially removably through the alined perforation 34, is a heat-resistant electrically insulating open-ended tube 39 in each of which is removably mounted a water-cooled electric terminal 40 normally urged axially inwardly by a spring-pressed electric terminal 41 mounted in the adjacent air-tight box 35.

Block 36, as shown in Fig. 4, is so shaped as to protect the edges of slot 30 against heat radiating heating elements 42.

Box 32, above block 36, is filled with heat-insulating material 43.

Extending between each aligned pair of water cooled terminals 40 is an electrical resistance heating element 42 which, for a major portion of its length may radiate its incandescence directly to a major portion of the length of shell 13, a substantial portion of that incandescent radiation being unobstructed as to passage through the perforations 16 to directly affect the berries within the shell 13.

Leading from the bottom of shell 10 is a comparatively large exhaust passage 45 which leads to and discharges into a condenser and washer 46 within which are arranged baffles 47 and 48. The condenser is preferably of the water curtain type and is, therefore, provided with a water inlet pipe 49 which discharges onto the uppermost baffle 48, and below the lowermost baffle 48 the condenser is provided with a vapor inlet passage 45 and a water outlet passage 51. The vapor passage 50 leads to a large volume high-vacuum exhauster (not shown), of any well known type, such for instance as the lobed impeller type.

The beverage making value of the ground roasted berries is dependent, to a marked degree, upon the color of the roasted berries because the color of the roasted berries determines the color and value of the brew. The color of the roasted berries is dependent upon a number of variables and is not purely a function of the temperature or length of heat treatment. With my method and apparatus the roasting is necessarily performed in a vacuum and, as desired color can only be determined by the utilization of a color sensitive means, such for instance as the human eye or the so-called electric eye, and as neither of these color sensitive means is capable of withstanding the necessary heat within the roasting chamber, I perforate head 10' at 60 and cover this perforation air-tight by a transparent cover 61. Across this cover, on the inner face of head 10', I provide a channel or conduit 62 having an upper open end 63 and a lower open end 64 somewhat smaller than end 63, the arrangement being such that the normal operation of the blades 14 and 15 within the drum 13, during operation of the drum, will send a continuous stream of berries through the channel 62 which will move slowly across the inner face of the transparent cover 61. Obviously, by this means, a continuous stream of the berry content of the apparatus may be constantly inspected during the roasting period without destruction of the essential vacuum within the roasting chamber. If desired, an electric eye may be placed opposite, but outside of, the transparent cover 61 and arranged to give an appropriate signal upon attainment of desired color of the roasting berries.

One side wall 62' of conduit 62 is hinged at its upper end so that the lower end may be swung toward or from the opposite wall to vary the outlet of the conduit and thus control the flow of berries therethrough. The free end of wall 62' is connected by link 62a with arm 62b carried by the carrier end of a rock-shaft 62c journalled in a packing gland 62d in head plate 10' and provided at its outer end with a handle 62e.

It is important and essential that, promptly upon the acquirement of desired color of the roasting berries, the vacuum within shell 10 be broken, yet, it is nevertheless desirable that exhaustion of the vapor content of the roasting chamber be continued after the vacuum is broken as a continuance of the exhaustion of the vapor contents insures removal of the dust and undesirable vaporized oils as well as assisting in rapid cooling of the discharging roasted berries. I therefore provide an exhaust passage 70, leading from the lower part of shell 10 and preferably remote from passage 45, and provided with a valve 71 at a point of convenient access.

It will be noted that electrical heating elements 42 are arranged opposite and just outside the upper regions of the interior of the roasting chamber 10 within cavity 37 of block 36; that the exhaust passage 45 leads from the lower regions of the roasting chamber; that the condenser is of a type to greatly facilitate the maintenance of a high vacuum within the roasting chamber; and that the exhauster is of a very substantial capacity, although the water-curtain condenser greatly reduces the volume of efficient gases before they reach the exhauster.

These proportions and arrangements are important for the following reasons:

It has long been well known that if the heat transfer to the green berries is too slow, the result is a baked rather than a roasted berry and that a baked berry does not afford a beverage of as good quality as a properly roasted berry.

It has also been long well known that berries roasted by present known methods and means deteriorate somewhat rapidly, so that freshly roasted coffee is considered preferable.

This deterioration has been due to the fact that the berries were not freshly roasted. A chemical change takes place, either in the roasted berry or in the ground particles, between the time of roasting and the time of brewing, this change being probably due to an oxidation of oils adhering to the outer surfaces of the roasted berry or particles having such outer surfaces. A natural sequence of this knowledge has led to the recent vigorous exploitation of "dated" coffee.

It has also been long well known that if freshly brewed coffee, even though brewed from freshly roasted berries, be allowed to cool and be then reheated, the reheated beverage is nowhere near as satisfactory as it would have been if it had been consumed while under its original brew heat.

I have discovered that the primary cause of these various deteriorations, supposedly due to lapse of time and temperature variations, have been primarily due to the presence, upon the external surfaces of the roasted berries, of remnants of natural fats exuded from the berries during the roasting process and remaining upon the external surfaces of the berries at the end of the roasting period, those oils being oxidizable upon exposure to the air.

I have also discovered that if the berries be quickly heated in a high vacuum by a heating medium which affords a substantial amount of light heat rays which directly impact upon the berries, and by maintaining the ambient medium around the surface of the berries at a substantial subatmospheric pressure, the vaporization of the readily oxidizable oils from the berries is enhanced to such a degree that they are abstracted and removed from the completely roasted berry to greater extent than heretofore.

I have also discovered that the deposit of unavoidable chaff and dust, emanating from the roasting berries, upon electrical heating elements is highly disastrous, resulting in short circuiting which quickly leads to destruction of the heating elements and that for this reason electrical heating elements for roasting coffee berries have not heretofore been commercially practicable.

I have solved this difficulty by arranging the heating elements in what may be fairly termed the "dead" pocket or cavity 37 in the upper regions of the heating chamber and by providing a large volume exhaust passage from the lower regions of the roasting chamber, so that the chaff and dust emanating from the roasting berries does not accumulate upon the electrical heating elements, the direction of movement of the dust and chaff being away from the heating element and toward and into the exhaust passage. The relation of cavity 37 to exhaust passage 45 is such that no substantial vapor currents can occur in cavity 37 during the roasting period.

By arranging the heating elements only in the uppermost region of the vacuum chamber and the exhaust outlet below the berry-containing drum, all chaff which is separated from the berries is carried by the exhausted volatiles, under the influence of the exhausting apparatus, downwardly away from the heating elements, thus guarding them from chaff accumulations.

The heating elements 42 must be of ample capacity and are preferably of such character as to operate without sagging and I have found so-called "Globar" elements satisfactory although I believe that other types of elements would be satisfactory.

The operation is as follows:

The drum is rotated and the heating elements 42 are then energized so as to bring the apparatus up to normal operating temperature which, in practice, has been found to be conveniently somewhat above 350° F. Thereupon door 23 is closed air tight, door 21 is removed, and the green berries are charged through opening 20 into drum 13, this charging occurring in a comparatively short period of two minutes or less, and the temperature within the roasting chamber dropping to somewhere in the neighborhood of 300° to 290° F.

As soon as charging has been effected, door 21 is sealed in place, the exhauster operating during charging, so that within the course of two or three minutes or less, a desired high degree of vacuum is attained. In practice, I have found that this vacuum should be in excess of that indicated by fifteen inches of mercury and preferably somewhere in the neighborhood of that indicated by twenty to twenty-six inches of mercury. While, during the early stage of roasting, there is a very substantial volume of vapor effluent from the berries, the exhauster, as previously stated, is of sufficient capacity to practically maintain the maximum vacuum throughout the entire roasting period and the application of power to the heating elements is such as to gradually increase the temperature of the ambient medium within the roasting chamber from somewhere in the neighborhood of 300° F. to somewhere in the neighborhood of 310° F. to 340° F. at the end of the roasting period, at which time the desired color as observable through the cover 61 will have been nearly attained, whereupon the power is disconnected from the heating elements and, as soon as desired color is attained, valve 71 is opened, so as to quickly break the vacuum within the roasting chamber. The discharge door 23 is thereupon withdrawn and the roasted berries rapidly discharged and cooled, the exhauster remaining in operation during the berry discharge period.

When coffee berries are roasted in the manner described above, it will be found that their volume slightly exceeds the volume of the green berry; that the weight of the roasted berry, per unit of green berries, is somewhat greater than the weight of the same type of green berries when roasted by present commercially practiced methods and apparatus; and that the surfaces of the berries are substantially free from readily oxidizable fats or oils. As a consequence, the roasted berries keep longer without deterioration, that is to say, the lapse of time between roasting and brewing ceases to be as important as heretofore. The ground particles do not deteriorate as readily. The brew obtainable from these berries has a finer aroma and flavor. The brew can be kept at brewing or drinking temperature for longer periods of time without deterioration. And, remarkably, the brew may be actually refrigerated in glass and subsequently reheated without the marked deterioration noticeable in brews made from coffee roasted by present commercial methods.

I have found that atmospheric conditions result in some variations in effective roasting temperatures and vacuums. But I am not able to state just what the relationship is. However, I have found in actual practice that the best results, as to flavor and volume and weight of roasted berry per unit of green berry, is apparently obtained with the temperature of the ambient gases above 290° F. at a subatmospheric pressure indicated by 20 or more inches of mercury.

The natural berry contains occluded carbon dioxide. When the green berry is roasted some of this carbon dioxide is lost and, as the carbon dioxide is probably the natural preservative of the oils of the berry against oxidization, the keeping quality of the roasted berry is a function of the carbon dioxide content.

I have found that when coffee berries are roasted in accordance with my improved method in apparatus of the character disclosed, the carbon dioxide content of the roasted berry is noticeably greater than the carbon dioxide content of the same type of green berry roasted by present known methods and apparatus and that while there is a normal loss of carbon dioxide content during storage periods of either the roasted berry or the ground particles, berries roasted in accordance with my improved method, as well as the ground particles thereof, will, at the end of any given storage period, contain a greater amount of occluded carbon dioxide than will berries, or their ground particles, which have been roasted by present known methods.

It is to be understood that the invention and the claims are not limited to the treatment of coffee berries as other berries or seeds capable of roasting, such, for instance, as soy beans, may be similarly treated, and the term "coffee berries" is to be considered as inclusive of such articles.

I claim as my invention:

1. Apparatus for roasting coffee berries, and the like, comprising a roasting chamber capable of being sealed air-tight and having in its upper portion through the major part of the length thereof, an inverted pocket and an exhaust passage leading from the lower part of the chamber, relatively large-volume exhausting means associated with said exhaust passage whereby a vacuum may be maintained within the chamber during the entire roasting period, a foraminous rotary drum mounted in said chamber between the open mouth of said pocket and the said exhaust passage and provided with interior berry-lifting and agitating means, electrically energized incandescent heat units mounted in said pocket and extending the major portion of the length of the drum and outside the path of movement of said drum, the construction being such that a substantial portion of the light rays emanating from the incandescent heating elements will directly impact the berries, air-tight exit means from the interior of the roasting chamber to the exterior of the structure, and means by which the vacuum within the roasting chamber may be promptly broken.

2. Apparatus for roasting coffee berries, and the like, comprising a roasting chamber capable of being sealed air-tight and having in its upper portion through the major part of the length thereof, an inverted pocket and an exhaust passage leading from the lower part of the chamber, relatively large-volume exhausting means associated with said exhaust passage whereby a vacuum may be maintained within the chamber during the entire roasting period, a foraminous rotary drum mounted in said chamber between the open mouth of said pocket and the said exhaust passage and provided with interior berry-lifting and agitating means, electrically energized incandescent heat units mounted in said pocket and extending the major portion of the length of the drum and outside the path of travel of said drum, the construction being such that a substantial portion of the light rays emanating from the incandescent heating elements may directly impact the berries, a transparent air-tight view area forming part of one end wall of the roasting chamber, a flow-retarding berry channel arranged across said view area within the roasting chamber in position to be normally filled by a continuous stream of berries during rotation of the drum, air tight exit means from the interior of the rotary drum to the exterior of the structure, and means by which the vacuum within the roasting chamber may be promptly broken.

3. Apparatus for roasting coffee berries and the like, comprising a roasting chamber capable of being sealed air tight and having an exhaust passage leading from the lower part of the chamber, relatively large-volume exhausting means associated with said exhaust passage whereby a vacuum may be maintained within the chamber during the roasting period, a foraminous rotary drum mounted in said chamber above the exhaust passage and formed to agitate berries therein, electrically energized incandescent heat units mounted in the roasting chamber only above the drum and over the major portion of the length thereof and outside the path of travel of the drum and guarded from chaff emanating from the berries, the arrangement being such that a substantial portion of the light rays emanating from said heating elements may directly impact the berries, and means by which the vacuum within the roasting chamber may be promptly broken.

4. Apparatus for roasting particles such as coffee, comprising a main chamber having a particle-discharge opening capable of being sealed against entry of air, exhausting means connected with the bottom of said main chamber and having a capacity capable of quickly establishing a vacuum within said chamber at the beginning of the roasting operation and thereafter maintaining such vacuum during the roasting period, electrically energizable heating elements arranged only in the upper part of the main chamber over the major portion of the length of a particle-container outside the path of travel thereof and guarded from chaff emanating from the berries, to furnish the roasting heat, a rotatable particle-container arranged in the main chamber between the heating elements and the exhaust, and means by which the particles may be agitated and uniformly subjected to radiations from the heating elements.

5. Apparatus of the character specified in claim 4 wherein the exhaust passage leads from near one end of the bottom of the main chamber and the main chamber is provided with a sealable air inlet discharging at the end of the bottom of the main chamber distant from the exhaust, whereby, upon opening of said air inlet, chaff lying upon the bottom of the main chamber will be swept into the exhaust.

6. Apparatus of the character specified in claim 4 wherein one wall of the main chamber is provided with an air sealed sight-area, and means is provided within the chamber to cause a retarded stream of closely associated particles to flow across said sight area in contact therewith to be visible therethrough under such conditions as that an observer may properly observe the roasted condition of the particles.

GEORGE G. GRIFFIN.